Jan. 11, 1955 D. M. WROUGHTON ET AL 2,699,015

METAL MIXTURE FOR SEALING TO GLASS

Filed Feb. 27, 1951

INVENTORS
D. M. WROUGHTON
E. D. GREGORY.
BY
ATTORNEY

United States Patent Office 2,699,015

Patented Jan. 11, 1955

2,699,015

METAL MIXTURE FOR SEALING TO GLASS

Donald M. Wroughton, Pittsburgh, Pa., and Edward D. Gregory, Clifton, N. J., assignors to Westinghouse Electric Corporation, East Pittsburgh, Pa., a corporation of Pennsylvania Application February 27, 1951, Serial No. 212,918

2 Claims. (Cl. 49—92.5)

This invention relates to metal-glass seals and more particularly to metal mixtures for sealing to glass.

In sealing a wire or article of metal into glass, the principal problem involved is finding a metal with a coefficient of thermal expansion approximating that of the glass. In vacuum-tight metal-glass seals, articles of the pure metals, tungsten, molybdenum, zirconium, titanium, platinum and copper may be sealed into the proper glass having a coefficient of thermal expansion nearly the same as that of the metal in each selected instance. If the metal part to be sealed into the glass is copper and has a very thin edge in contact with the glass, all glasses may be used. Otherwise, for use with soft glass, only platinum and titanium of this pure metal group are practical.

Further, for example, in the case of stem making for electric lamps and electronic tubes, another desirable property of the metal lead-in conductor which is intended to carry an electrical current through the glass press of the stem, is that the lead should have a low specific resistance.

In the stem-making case, composite lead-in conductors, such as copper-clad steel, can be matched in thermal expansion with an appropriate soft glass, but because of their small total cross section, their resistivity is high. Further, alloys of selected metals with proper expansion coefficients can be employed, but again, the specific resistance would doubtlessly be characteristically above desired limits.

In low priced lamp and electronic tube glass stem manufacture, wherein a metallic leading-in conductor is passed through a soft glass press of a stem, it is often necessary to select a given soft glass for said stem to avoid an expensive and large graded seal between the glass envelope of the lamp or tube and the stem. Here the problem may be that of arriving at a metal having a coefficient of thermal expansion approximating that of the glass. In some soft glass instances, the available matching metals, as for example, platinum and titanium, are limited in number and extremely expensive.

Hence, it has been found advantageous, according to our invention, to provide a simple mixture of two metals, such as copper and molybdenum, which will not alloy appreciably, and which have the proper thermal expansion for matching a given glass. By mixing powdered copper and molybdenum in desired quantities, pressing, and sintering, or by infusing molten copper into the interstitial spaces of a molybdenum bar of predetermined porosity, a mixture of the pure metals can be obtained having a desired resulting coefficient of thermal expansion. Said coefficient is determined by the proportionate volumes of the pure copper and pure molybdenum in the mixture. The copper will wet and adhere to molybdenum very well, but will not alloy with the molybdenum appreciably. Thus the mixture of two pure metals has the excellent conductivity of two good conductors and a desirable resulting low specific resistance.

Further, metals such as copper and molybdenum are diamagnetic and in high frequency devices would reduce radio frequency internal losses. The presence of the pure molybdenum in the mixture produces good strength, while the pure copper in the mixture lends some ductility for bending in the cold state.

In its general aspect, the present invention has the objective of overcoming the aforementioned disadvantages of the prior art soft glass stem making and metal-glass seals.

Specifically, an object of the present invention is a lead-in conductor or metal part for sealing into soft glass, comprising a mixture of two non-alloying metals which will match the coefficient of expansion of most soft glasses.

Another and specific object of the present invention is a lead-in conductor or metal part for sealing into soft glass, comprising a mixture of two non-alloying metals which will have a high electrical conductivity.

A further object of the present invention is a lead-in conductor or metal part for sealing into glass, comprising a mixture of two non-alloying metals which is diamagnetic and has resulting low losses in high frequency devices.

An additional object of the present invention is a lead-in conductor or metal part for sealing into soft glass, comprising a mixture of two non-alloying metals which is strong and stiff.

A still further object of the present invention is a lead-in conductor or metal part for sealing into soft glass, comprising a mixture of two non-alloying metals which is sufficiently ductile for shaping and bending.

Other objects of the invention will appear to those skilled in the art to which it appertains as the description thereof proceeds, both by direct recitation thereof and by implication from the context.

Referring to the accompanying drawing, in which like numerals of reference indicate similar parts throughout the several views.

Figure 1:
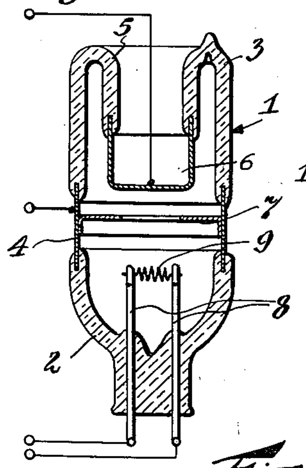
Fig. 1 is a section of a gas filled thyratron device embodying our invention.

Referring to the electric translation device or gas-filled thyratron of Fig. 1, a closed envelope 1 is provided which comprises a basal cup-like portion 2, a head portion 3 thereabove, both preferably soft glass and an intervening neck or metallic grid cylinder 4, wherein our invention is included and which is sealed at its end peripheral margins to the basal and head portions respectively. Thyratron is the trade name for an electronic tube in which the unidirectional flow of electron current through an inert gas may be started by impressing an electrostatic charge on the control electrode. While a gas-filled thyratron has been arbitrarily selected for illustrative purposes, the invention is not to be understood as restricted to employment with thyratrons only.

Said head portion 3 is preferably reentrant, as at 5, its upper part, so as to provide a downwardly directed margin within the outer wall of the head. From this reentrant portion 5 depends a cup-shaped anode 6 wherein also our invention is included. The said downwardly directed margin of the reentrant part of the head is sealed to the upper edge margin of the cup 6 peripherally thereof.

Inside grid cylinder 4 is a metallic cup-like grid partition 7 which is joined, as by welding, along the periphery of its flanged edge to the inner surface of cylinder 4. Said partition 7 has a suitable axial center hole to permit electron passage therethrough.

Projecting through and sealed to basal portion 2 in spaced axial alignment are two parallel lead-in conductors 8 wherein also our invention is embodied. Appropriately mounted on the internal extremities of these conductors 8 is a thoriated tungsten filament or cathode 9.

After sealing, this thyratron is given the usual exhaust which may comprise baking, induction treating, cathode sintering, final fill with gas such as xenon and tip off.

Figure 2:
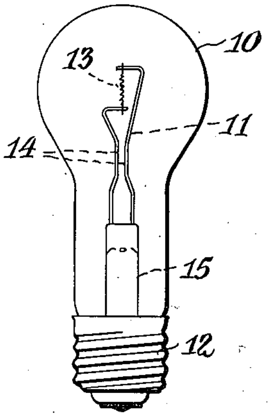
Fig. 2 is a perspective view of a street series type incandescent lamp.

The street series type incandescent lamps, as shown in Fig. 2, comprises a soft glass envelope 10, a filament mount 11, sealed to said envelope, and a base 12. While a street series type incandescent lamp has been arbitrarily selected for illustrative purposes, the invention is not to be understood as restricted to employment with only such lamps. Said mount 11 consists of a high current, low voltage, filament 13 mounted axially on lead-in conductors 14, involving our invention, of a soft glass stem 15.

In accordance with the usual practice, the lamp is sealed, exhausted and based. During exhaust, the lamp may be baked, flushed and pumped, and given a final fill of a gas such as nitrogen.

The method of making parts for sealing to soft glass, such as grid cylinder 4 and cup-shaped anode 6 of Fig. 1, and lead-in conductors such as conductor 8 of Fig. 1, or conductors 14 of Fig. 2, for sealing through soft glass, wherein our invention is contained, is shown in Fig. 3 through Fig. 7 of the accompanying drawing.

Figure 3:
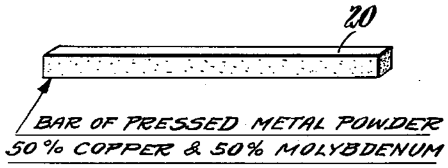
Fig. 3 is a perspective view of a bar of a pressed powdered metal mixture of copper and molybdenum.

According to our invention, in Fig. 3, the reference numeral 20 designates a bar of a mixture of, for example, 50% molybdenum and 50% copper by volume. Said bar 20, as shown in Fig. 3, may be made by mixing fine powders of the molybdenum and copper having particles capable of passage through a 200 mesh/inch screen.

Figure 4:
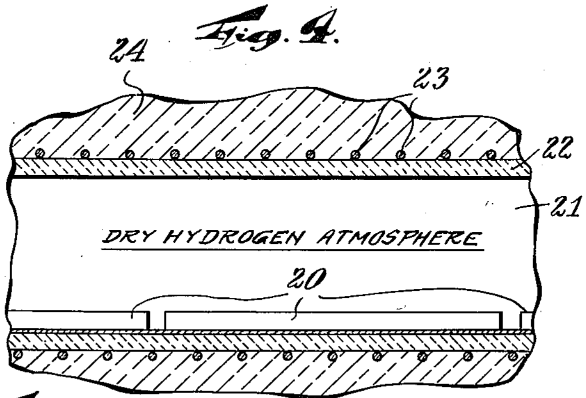
Fig. 4 is a longitudinal sectional view of a hydrogen furnace for sintering the bar of Fig. 3.

The mixture is then pressed at high pressure in a steel mold into a bar having a cross-section, suitably ¼" square. The pressed bar 20 is sintered for two hours at 1050° C. in a dry hydrogen atmosphere of a furnace 21, such as is shown in Fig. 4.

Figure 5:
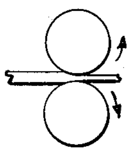
Fig. 5 is an end view of apparatus which may be used for rolling the sintered bar after removal from the furnace of Fig. 4.

Said furnace 21 may consist of a refractory tube 22 with movable doors (not shown) at each end, a resistance heating element 23 coiled about said tube, powdered insulating material 24 such as magnesium oxide, packed about said coil and tube, and a fire brick enclosing structure (not shown). The sintered bars are then rolled between high pressure rolling means or the like, as shown in Fig. 5, to form a lead-in conductor such as conductor 8 of Fig. 1 or conductors 14 of Fig. 2 of the desired circular cross-section. The rolling operation eliminates any voids or minute spacings in the mixture and produces a density of 99% to 100% of theoretical density as calculated from volume percentages.

Figure 6:
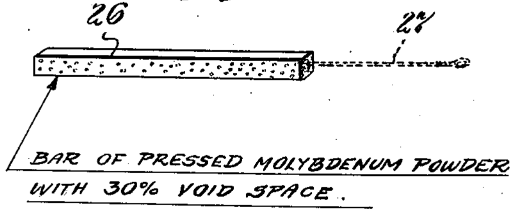
Fig. 6 is a perspective view of a porous bar of pressed molybdenum powder.
Figure 7:
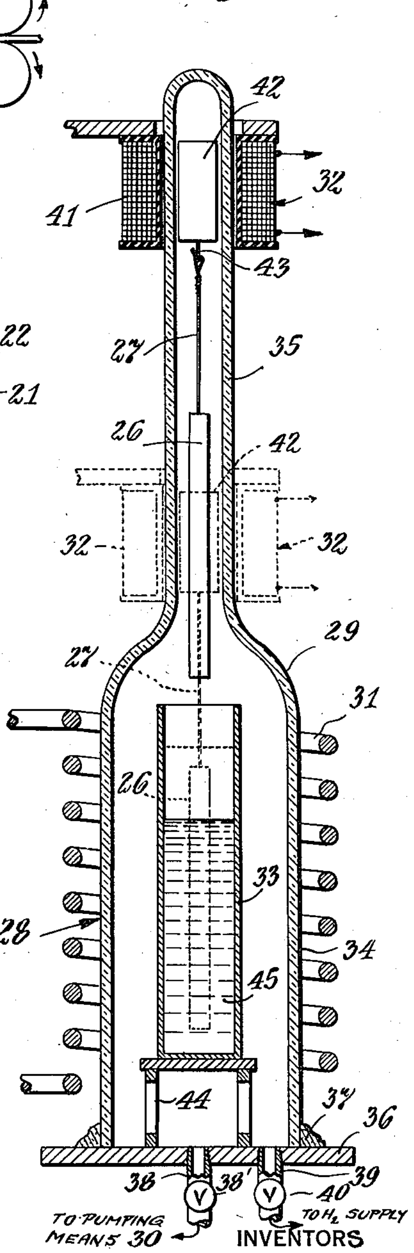
Fig. 7 is a section of an impregnating apparatus for infusing copper into the void space of the molybdenum bar of Fig. 6.

Further, according to our invention, a lead-in conductor, such as conductor 8 of Fig. 1, may be produced by an alternative infusion or impregnation method as shown in Figs. 6 and 7. A pulverized mass of pure molybdenum powder is pressed in a suitable steel mold into a porous bar 26 of approximate ¼" square cross-section at a pressure such that a desired void space, for example, 30% exists in the pressed bar. This interstitial void space corresponds to the desired copper composition by volume of bar 26 after impregnation. Affixed, as by welding, to one end of bar 26 are suitable suspension or mounting means, in this case a refractory wire 27 having a loop at its unattached extremity. Molten copper is then infused into the porous molybdenum bar 26 by means of the impregnating apparatus 28 of Fig. 7.

Said impregnating apparatus 28 comprises essentially a "Vycor" or quartz induction bottle 29, pumping means 30 (not shown) an induction heating coil 31, elevating means 32 for the work, and an open-ended refractory metal container 33.

Open-ended circular "Vycor" bottle 29 may consist of a lower induction heating portion 34 near the open end, conforming in configuration to the usual induction bottle of this type, and an upper closed end portion 35 axial with lower portion 34 and having a smaller cross-section than said lower portion. Said bottle 29 is supported on a metallic mounting plate 36 and sealed thereto near the open end of the bottle by suitable vacuum sealing means 37, such as silicone putty. Through a convenient hole in plate 36, connection is made to valve 38' and pumping means 30 by an exhaust pipe 38, handily joined to the plate 36 as by brazing. Also depending below plate 36 and affixed thereto along the side walls of an appropriate hole in a vacuum-tight joint, is hydrogen line 39 which connects through valve 40 to a hydrogen supply (not shown).

The elevating means 32 for the work comprises a solenoid or an electromagnet 41 of generally hollow cylindrical configuration, which is disposed axially about and moves in close proximity to the outer surface of the upper portion 35 of bottle 29 with small clearance, and a suitable power supply (not shown). Inside bottle 29 is provided a magnetic cylindrical work carrier 42, as an armature for the solenoid 41, which fits the inside diameter of upper portion 35 also with small clearance and carries a suitable loading hook 43 on its lower face.

Axially aligned within the bottle 29 on the top of an appropriate ceramic supporting table 44 is open-ended container 33, suitably graphite and half filled with copper 45. Said container 33 has the appropriate inside diameter and length to permit the complete immersion of the bar 26 within said container. Supporting table 44 is juxtaposed in turn on the upper surface of mounting plate 36.

Induction heating coil 31 axially surrounds lower portion 34 of bottle 29 with a sufficiently small amount of clearance to insure satisfactory radio frequency coupling between container 33 within said bottle 29 and the coil 31.

To impregnate bar 26 with copper 45, the work, namely bar 26 and mounting means 27, are suspended axially from magnetic work carrier 42 of impregnating apparatus 28 by inserting loading hook 43 of carrier 42 through the loop of mounting means 27. During the attachment of the work to carrier 42, it will be understood that the open end of the "Vycor" bottle 29 is held by suitable blocking means (not shown) a sufficient distance above mounting plate 36 so that the elevating means 32 securing said carrier therein by its magnetic field is juxtaposed at the lowest point of its downward travel with respect to the upper closed end portion 35 of bottle 29. After attachment of the work to the carrier 42, the electromagnet 41 of the elevating means 32 raises carrier 42 and the work to a position in close proximity to the closed end of the bottle 29, in order that the graphite container 33 and the copper may be aligned axially on table 44 above mounting plate 36.

The bottle 29 is then unblocked and its open-end brought into contact with mounting plate 36. During the downward movement of bottle 29, the work carrier 42, through a like movement of elevating means 32, retains its position near the closed end of the bottle 29 and above the container 33 and any induced field of induction coil 31. Said bottle 29 is sealed to plate 36 by vacuum putty 37 and the interior of the bottle is evacuated through exhaust pipe 38 and valve 38' by pumping means 30.

When the desired vacuum has been obtained, bar 26 is lowered by elevating means 32 partially within container 33, but out of contact with the copper 45 and all three members, namely bar 26, container 33 and copper 45 are induction heated slowly by coil 31 to, approximately 1180° C. a temperature 100° C. above the melting point of the copper 45, in order that said copper will wet the molybdenum bar 26. At this point molybdenum bar 26 is lowered into the molten copper until said bar is completely immersed, the pumping means 30 is cut off from the bottle 29 by closing valve 38', and hydrogen gas at a pressure slightly less than one atmosphere is admitted to the bottle 29 through valve 40 and line 39. This hydrogen atmosphere prevents oxidation of the molybdenum bar 26 and the copper 45 and forces the molten copper into the interstitial void spaces in the the porous molybdenum bar 26. After approximately three minutes of contact between the two metals, bar 26, now impregnated with copper 45, is withdrawn from the container 33 and allowed to cool in the hydrogen atmosphere. After the impregnated bar 26 is cooled, the hydrogen pressure within bottle 29 is increased above one atmosphere to break the silicone putty seal between bottle 29 and plate 36. Valve 40 is immediately closed and the work, namely impregnated bar 26 and mounting means 27, withdrawn from bottle. The mounting means are severed from the bar, as by cutting.

The impregnated bar 26 is rolled, as in the apparatus of Fig. 5, to the desired cross-section of a lead-in conductor such as conductor 8 of Fig. 1 or conductors 14 of Fig. 2. As a result of this rolling method of working the density of the finished lead-in conductor wire is 99% to 100% of maximum theoretical density.

It will be understood that either the sintered bar 20 or the impregnated bar 26 could be rolled into a thin flat sheet which could be die-formed or spun into cup-shaped parts, similar to anode 6 of Fig. 1, and cylinders machined therefrom, similar to grid cylinder 4 of Fig. 1.

It has been found that the composition of the mixture of molybdenum and copper employed in the manufacture of parts for sealing to soft glass, such as cylinder 4, anode 6, lead-in conductors, such as conductor 8, and conductors 14 for sealing through soft glass, may vary from 40% molybdenum–60% copper, having a coefficient of expansion of $11\times10^{-6}$ in./in./° C. to 80% molybdenum–20% copper, having a coefficient of expansion of $8.8\times10^{-6}$ in./in./° C. This coefficient of expansion range corresponds uniformly with the coefficients of expansion of most soft glasses. For example, several typical soft glasses and their coefficients of expansion are listed in the following table:

| Code No. | Corning G. No. | Coefficient of expansion in./in./° C. |
|---|---|---|
| G001 | 1 | $9.0\times10^{-6}$ |
| G005 | 5 | $8.9\times10^{-6}$ |
| G012 | 12 | $8.7\times10^{-6}$ |
| 887 | 858V | $8.9\times10^{-6}$ |

While a specific mixture of molybdenum and copper has been described, it will be understood that other metals probably can be used to make lead-in conductors and parts for sealing to soft glasses. The substitution of silver for copper, and/or the substitution of tungsten for molybdenum are possibilities. Other methods of making mixtures such as wet doping molybdenum oxide with copper salts followed by reduction, pressing, and sintering may be employed. Other methods of working the billet such as swaging, drawing, or extruding said billet to produce lead-in conductors and parts for sealing may be substituted.

Thus it will be seen from the foregoing description that our invention has overcome the defects of the prior art soft glass stems and metal to soft glass seals. We have provided a lead-in conductor, such as conductor 8 of Fig. 1 or conductors 14 of Fig. 2, or a metal part, such as grid cylinder 4 or anode 8 of Fig. 1, for sealing into soft glass, said conductor comprising a mixture of two non-alloying metals which will match the coefficient of expansion of most soft glasses. Specifically, the present invention provides the mixture having a composition which may vary from 40% molybdenum–60% copper to 80% molybdenum–20% copper. Lead-in conductors and parts for sealing to soft glasses, which are made from such a mixture have a high electrical conductivity, are diamagnetic and have low losses in high frequency devices, and possess the quality of strength and ductility required for shaping and bending.

Although preferred embodiments of our invention have been disclosed, it will be understood that modifications may be made within the spirit and scope of the appended claims.

We claim:

1. In an electron tube comprising a soft glass member and a metal member embedded and in direct contact with said glass member, said metal member comprising a mixture of from 40 to 80% by volume of molybdenum and the balance by volume of copper, said mixture having a coefficient of expansion in the range of $8.8\times10^{-6}$ in./in./° C. to $11\times10^{-6}$ in./in./° C.

2. In an incandescent lamp comprising a soft glass member and a metal member embedded and in direct contact with said glass member, said metal member comprising a mixture of from 40 to 80% by volume of molybdenum and the balance by volume of copper, said mixture having a coefficient of expansion in the range of $8.8\times10^{-6}$ in./in./° C. to $11\times10^{-6}$ in./in./° C.

References Cited in the file of this patent

UNITED STATES PATENTS

| | | |
|---|---|---|
| 927,935 | Von Bolton | July 13, 1909 |
| 1,034,949 | Arsem | Aug. 6, 1912 |
| 1,477,797 | Adams | Dec. 18, 1923 |
| 1,552,184 | Adams | Sept. 1, 1925 |
| 1,809,780 | Gebauer | June 9, 1931 |
| 1,992,493 | Los | Feb. 26, 1935 |
| 2,061,755 | Cooper | Nov. 24, 1936 |
| 2,288,499 | Van Horn | June 30, 1942 |
| 2,411,523 | Chivigny | Nov. 26, 1946 |
| 2,490,776 | Braunsdorff | Dec. 13, 1949 |